Nov. 26, 1968 H. FRIEDMAN 3,413,141

METHOD AND APPARATUS FOR MAKING ORIENTED MAGNETIC RECORDING MEDIA

Filed Sept. 2, 1965

INVENTOR
HARRY FRIEDMAN

BY Owen Lamb
AGENT

United States Patent Office
3,413,141
Patented Nov. 26, 1968

3,413,141

METHOD AND APPARATUS FOR MAKING ORIENTED MAGNETIC RECORDING MEDIA

Harry Friedman, East Orange, N.J., assignor to International Business Machines Corporation, Armonk, N.Y., a corporation of New York Filed Sept. 2, 1965, Ser. No. 484,637
5 Claims. (Cl. 117—93.2)

ABSTRACT OF THE DISCLOSURE

In the method of applying a magnetic coating to a moving substrate, a magnetic applicator blade is used which blade has a magnetic field (in the region where it contacts the coating) which is effective to orient the magnetic coating.

Figure 1:
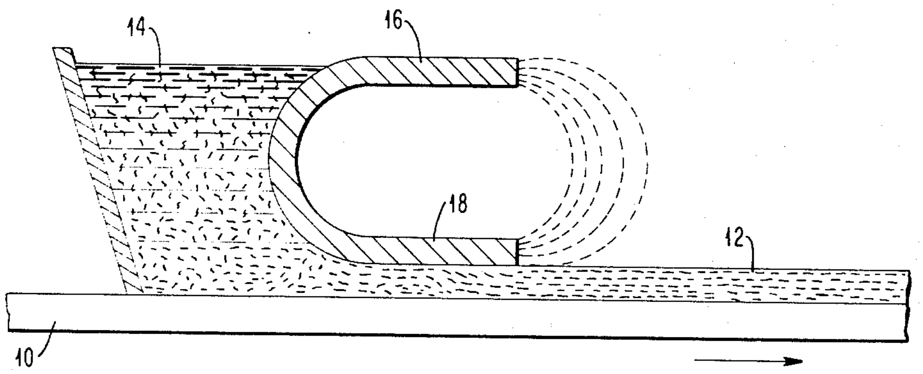

This invention relates to magnetic recording tape and more particularly to an improved method and apparatus for producing a magnetic recording tape.

Magnetic recording tape is usually produced by precoating a tape base which may be paper or plastic (such as acetate or polyester) with an adhesive liquid which conditions one side of the tape base for receiving an adherent coating of a magnetic material. The magnetic material is formed of a dispersion of finely divided magnetic particles, usually magnetic oxide of iron, which is suspended in a liquid vehicle comprised of one or more binders and solvents. A magnetic coating of a predetermined thickness is spread over the partially dried adhesive coating. The magnetic coating is then dried to evaporate the solvents and leave only the magnetic materials and the binder. The precoating step may, of course, be eliminated.

Improved fidelity with respect to output level and reduced background noise is obtained when the magnetic particles are oriented or aligned in the magnetic coating before the binder has hardened. The particles are oriented so that their magnetic axes lie in the direction of the proposed tape travel past a recording head.

In prior systems for aligning these particles, the particles are oriented after the coating is applied and before it has finally dried. In the prior art, the wet magnetic film is applied to the tape substrate by a suitable means such as the doctor blade and then the wet tape is drawn over the surface of the poles of a magnet usually placed on the opposite side of the tape to the wet coating. In such cases, the wet film becomes subject to the separate magnetic attraction of each pole of the magnet as the tape passes over the magnet. The magnetic particles are thus subjected to a reversal of the magnetic field in a relatively short space of time, thereby causing particle disorientation together with plane distortion from the longitudinal direction in the direction of tape travel.

It is a paramount object of this invention to provide an improved apparatus for producing a magnetic recording tape.

It is a further object of this invention to provide an improved method of orienting the magnetic particles during the process of forming magnetizable coating on the tape.

The above objects are accomplished in accordance with the invention by applying a layer of magnetizable material suspended in a fluid binder to a tape base with one pole of a magnet which functions both as an applicator blade and as an orienting magnetic field source for orienting the particles suspended in the magnetizable material.

The invention has the advantage that because of magnetic attraction of the wet magnetizable binder to the magnet, a great amount of additional shear is introduced into the material at the point of application intending to make the alignment more nearly parallel to the surface of the substrate.

The invention also has the advantage that the surface of the final tape produced tends to be smoother than the surface of tapes produced by methods which use a separate doctor blade and magnet.

The foregoing and other objects, features and advantages of the invention will be apparent from the following more particular description of a preferred embodiment of the invention as illustrated in the accompanying drawings.

Figure 2:
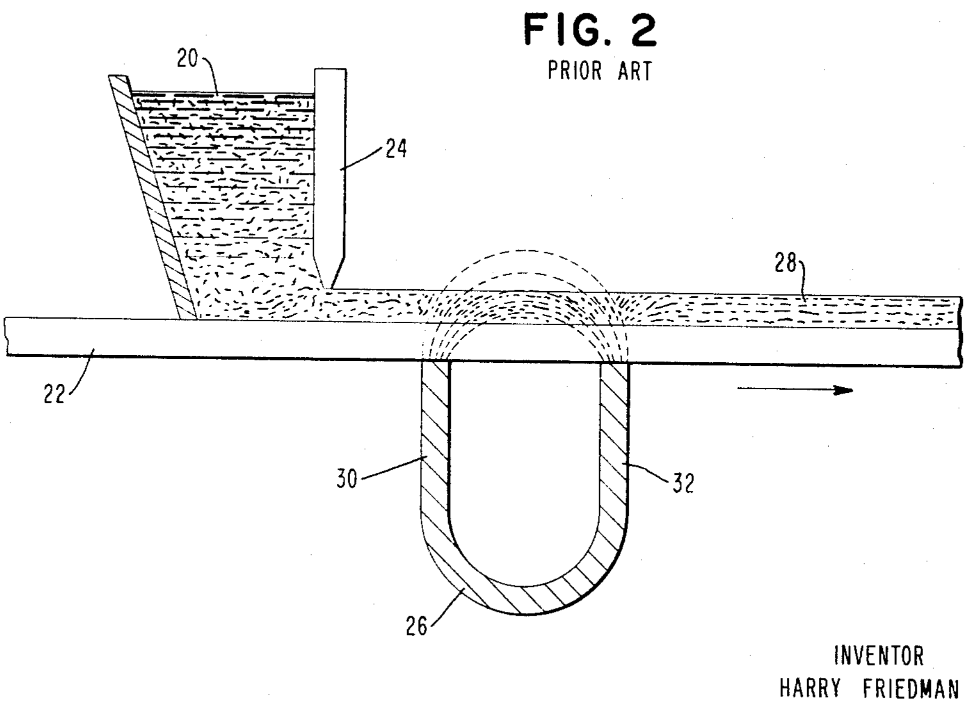
FIG. 2 PRIOR ART

In the drawings:

FIG. 1 is a sectional view of apparatus employed in practicing the present invention in the production of magnetic recording tape; and FIG. 2 is an example of a prior apparatus for producing magnetic recording tape.

Referring now to the drawing, a tape base 10 is provided on which a magnetic coating 12 is applied. The magnetic coating material 12 is stored in a reservoir 14. A U-shaped magnet 16 is provided, one pole 18 of which is highly polished, at least at the point where the magnetizable material 12 comes in contact therewith.

The substrate is driven past the reservoir 14 and the permanent magnet 16. The permanent magnet 16 is oriented so that its polished pole 18 is parallel to the surface of the substrate 10 and is at a distance therefrom which is proportional to the desired thickness of the finished magnetic layer 12. The magnetic particles are shown schematically in a disoriented array in reservoir 14. As the particles pass under the polished pole of the magnet 16, the lines of magnetic force, shown dotted in FIG. 1, cause the particles to orient themselves parallel to the lines of force. As the particles pass from under the polepiece 18, they are substantially parallel to the plane of the tape 10.

The magnet 16 shown in the drawing is a permanent magnet. However, magnets of the electromagnetic type, having windings thereon which are energized by an electric current, may be satisfactorily used.

By using the apparatus of FIG. 1, the particles in the coating are not subjected to a reversed magnetic field, as was the case in the prior art shown in FIG. 2. In FIG. 2, the magnetic coating material is stored in a reservoir 20 and is applied to the magnetic tape base 22 by a doctor blade 24. A magnet 26 is positioned on the opposite side of the coated surface of the tape. As the tape is drawn past the magnet in the direction of the arrow, the particles in the coating 28 are subjected to the magnetic fields of force (shown by dotted lines) of the magnet 26.

Each magnetic particle in the coating 28 tends to become a separate magnet with its own north pole and south pole at each end of its magnetic axis. The particles tend to be arranged at the first pole 30 in one direction due to the magnetization pattern. As the tape moves, the direction of magnetization is reversed as the particles pass the pole 32 which is of opposite polarity to the pole 30. Thus the particles are subjected to a flip-flop action. Since the coating 28 is being dried, the oriented particles are quickly set or frozen in their positions so that alignment past the pole 32 is not as complete as it would be if the coating 28 were still in a more fluid state. The final alignment occurs at the last trailing edge of the pole 32. The particles do not assume as nearly a parallel direction in this prior art example as they do with the apparatus shown in FIG. 1 in which the lines of force extending from the pole 18 are more nearly parallel to the tape surface 10 than are the lines of force extending from the pole 32 in FIG. 2.

In summary, therefore, by practicing the invention, the particles in the magnetic coating 12 are more nearly aligned parallel to the tape surface 10 because as the coating material leaves the applicator magnet pole 18, the magnetic material is still in a highly fluid state since it has not been subjected to any drying process. At this time the particles suspended in the coating 12 are subjected to a strong magnetic field whose lines of force are substantially parallel to the magnetic tape 10. The particles, as they pass under the pole 18, are not subjected to a magnetic field of changing direction as was the case in the prior art shown in FIG. 2. Thus the particles are more nearly aligned parallel to the surface 10.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The method of orienting magnetizable elements in a record medium which comprises applying an active layer of magnetizable material suspended in a fluid binder to a tape base with one pole of a magnet which functions both as an applicator blade and as an orienting magnetic field source.

2. The method of forming a magnetic record tape which comprises continuously applying an active layer of magnetizable material suspended in a fluid binder to an elongated tape base with one pole of a magnet shaped to form an applicator blade which emanates fields of force substantially parallel to the tape base through the magnetizable material while it is still in a fluid condition to thereby cause the particles suspended in said material to align themselves substantially parallel to the tape base.

3. Apparatus for applying a magnetizable material suspended in a fluid binder to a surface which comprises:
- a reservoir for containing the magnetizable material and the fluid binder; and
- a magnetized applicator blade cooperating with said reservoir for controlling the flow of material from the reservoir to the surface.

4. The combination according to claim 3 in which the applicator blade is oriented so that its lines of magnetic force are substantially parallel to the surface to be coated.

5. The combination according to claim 3 wherein the magnetized applicator blade is substantially U-shaped, and one pole of the magnet is positioned parallel to the surface.

References Cited

UNITED STATES PATENTS

| | | | |
|---|---|---|---|
| 2,774,329 | 12/1956 | Smith | 118—118 |
| 2,796,359 | 6/1957 | Speed. | |
| 2,998,325 | 8/1961 | Camras | 117—64 |
| 3,001,891 | 9/1961 | Stoller | 117—93.2 |
| 3,256,112 | 6/1966 | Camras | 117—93.2 |

FOREIGN PATENTS

| | | | |
|---|---|---|---|
| 239,183 | 6/1962 | Australia. | |

ALFRED L. LEAVITT, *Primary Examiner.*

J. H. NEWSOME, *Assistant Examiner.*